Patented Sept. 13, 1938

2,129,917

UNITED STATES PATENT OFFICE 2,129,917

MANUFACTURE OF BROMONAPHTHOIC ACID

David Alexander Whyte Fairweather, Grangemouth, Scotland, assignor to Imperial Chemical Industries Limited, a corporation of Great Britain No Drawing. Application March 29, 1937, Serial No. 133,743. In Great Britain April 25, 1936

3 Claims. (Cl. 260—515)

This invention relates to a new and improved process for the preparation of 8-bromo-1-naphthoic acid.

In the Journal of the Chemical Society, 1934, page 170, there is described the process for producing 8-bromo-1-naphthoic acid by reacting upon anhydro-8-hydroxymercuri-1-naphthoic acid with bromine in concentrated acetic acid. The yields of 8-bromo-1-naphthoic acid obtained from this process, however, are relatively low.

The object of this invention is to provide a new and improved process for preparing 8-bromo-1-naphthoic acid in high yields and by a simpler and more economical procedure than heretofore employed. It is a further object of this invention to provide a method for brominating anhydro-8-hydroxymercuri-1-naphthoic acid with bromine in hydrochloric acid.

The following examples are given to more fully illustrate the invention. The parts used are by weight.

Example 1

A solution containing 371 parts of anhydro-8-hydroxymercurinaphthoic acid, 112 parts of 88% caustic potash, and 2700 parts of water is cooled to 0–5° C., 200 parts of hydrochloric acid (sp. gr. 1.16) are added, then a solution containing 165 parts of bromine, 320 parts of hydrochloric acid (sp. gr. 1.16) and 1660 parts of water is added rapidly, stirring is continued for half an hour, and the resulting product filtered off, washed and dried. The operations in the presence of hydrochloric acid are preferably carried out at 0–5° C. 251 parts of 8-bromo-1-naphthoic acid of a melting point of 176° C. are obtained.

Example 2

A solution of potassium 8-hydroxymercuri-1-naphthoate is made by heating to 60–80° C., 371 parts of anhydro-8-hydroxy-mercuri-1-naphthoic acid, 115 parts of 90% caustic potash and 2250 parts of water. The solution is filtered to remove traces of insoluble matter, if present, and cooled to about 12° C.

The above solution is run while stirring into a solution of 185 parts of bromine in 875 parts of hydrochloric acid (sp. gr. 1.14) and 875 parts of water to which has been added crushed ice. The addition of the potassium 8-hydroxymercuri-1-naphthoate solution is carried out in 10 minutes or less, the quantity of ice being such that the final temperature is 0–5° C. The mixture is stirred for half an hour and the product is then filtered and dried. 247 parts of 8-bromo-1-naphthoic acid of a melting point of 177–178° C. are obtained.

By reacting upon anhydro-8-hydroxymercurinaphthoic acid with bromine in hydrochloric acid, an exceptionally high yield of a relatively pure 8-bromo-1-naphthoic acid is obtained. This intermediate is of particular value for the preparation of dyestuffs.

It is, of course, understood that many apparently widely different embodiments of this invention may be made without departing from the spirit and scope of this invention, and it is to be understood that I do not limit myself to the specific embodiments given herein except as defined in the appended claims.

I claim:
1. In the process for the manufacture of 8-bromo-1-naphthoic acid, the step which comprises reacting anhydro-8-hydroxymercuri-1-naphthoic acid with bromine in aqueous hydrochloric acid.

2. In the process for the manufacture of 8-bromo-1-naphthoic acid, the steps which comprise dissolving anhydro-8-hydroxymercuri-1-naphthoic acid in water as the potassium salt and adding thereto an aqueous hydrochloric acid solution of bromine.

3. In the process for the manufacture of 8-bromo-1-naphthoic acid, the step which comprises reacting upon an aqueous solution of an alkali-metal salt of anhydro-8-hydroxymercuri-1-naphthoic acid with an aqueous hydrochloric acid solution of bromine at temperatures of from 0 to 5° C.

DAVID A. W. FAIRWEATHER.